March 10, 1964  L. W. BELL ETAL  3,124,029
SELF-DRILLING SHIELD STRUCTURE
Filed March 22, 1960
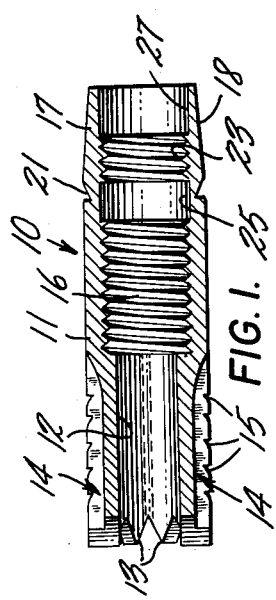
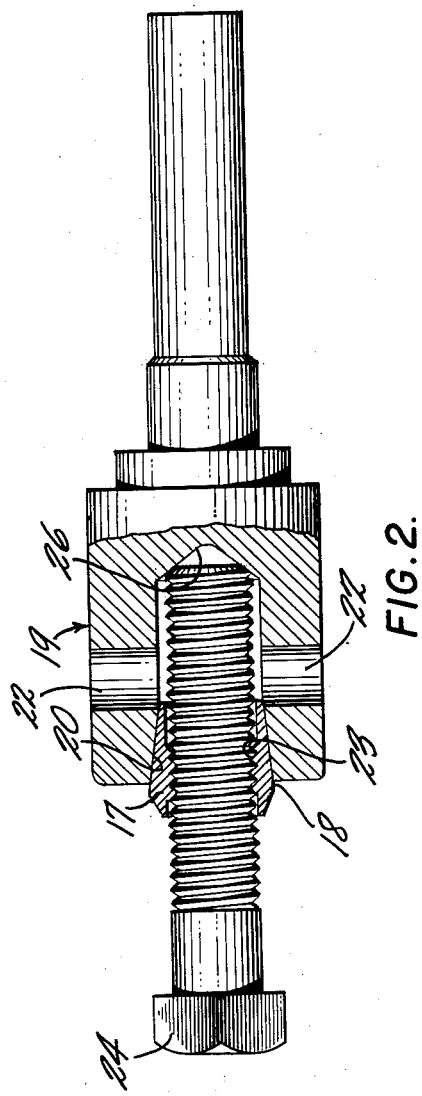
INVENTORS.
LEWIS WALTER BELL &
IZHAR PESKIN
BY
their ATTORNEYS.

of Delaware
United States Patent Office 3,124,029
Patented Mar. 10, 1964

3,124,029
SELF-DRILLING SHIELD STRUCTURE
Lewis Walter Bell, Monroe, and Izhar Peskin, Cornwall on the Hudson, N.Y., assignors, by mesne assignments, to Star Expansion Industries Corporation, a corporation of Delaware
Filed Mar. 22, 1960, Ser. No. 16,772
1 Claim. (Cl. 85—2.4)

This invention relates to self-drilling shields adapted to be embedded in masonry and the like, and more particularly, to a new and improved shield structure designed to facilitate installation operations.

In one well-known method of mounting an object on a masonary structure such as a concrete wall, an expansion shield is inserted into a hole in the wall and then deformed so as to fit tightly within the hole. In expansion shields of the self-drilling type, the forward end of the shield is provided with hardened teeth so that the shield itself can be used to drill the hole and an axial bore extends through the shield to permit cuttings to escape during drilling. Moreover, the rear end of the shield has a head portion tapered to fit into a mating hole in a driving chuck and an annular groove in the peripheral surface of the shield body enables the head portion to be broken off after the shield is mounted in the hole. Also, internal threads are formed in the bore of the shield portion mounted in the hole to receive a bolt for supporting the object to be mounted.

Customarily, after the shield has been mounted in the above manner the broken off head portion is forced out of the chuck by an ejector tool which is inserted in a transverse passage communicating with the shield-receiving hole in the chuck. In many instances, however, as when a power hammer has been used to drive the shield, the head portion is so thoroughly locked in the chuck that it is difficult or impossible to remove it with the ejector and this is particularly true where the ejector tool, the head portion, and the transverse passage have become deformed by continued efforts to remove a firmly engaged head portion.

Accordingly, it is an object of the present invention, to provide a simple and effective means for removing an expansion shield head portion from a driving chuck.

Another object of the invention is to provide a new and improved expansion shield structure enabling quick and easy removal of a broken off head portion from a chuck.

A further object of the invention is to provide an expansion shield structure having a break-off head portion which can be removed from a chuck without using an ejector tool.

These and other objects of the invention are attained by providing the head portion of an expansion shield with gripping means within the axial bore. With this arrangement the shield head can be removed from a chuck by exerting an extracting force between the gripping means and the chuck. In one embodiment the gripping means constitutes an internal thread in the bore of the head portion and preferably this thread is the same as that within the body portion of the expansion shield. Consequently, the same bolt used to mount an object in the embedded shield body can be threaded into the broken-off head portion locked into a chuck and force can be applied between the bolt and the chuck. Moreover, if desired, the extracting force can be exerted by turning the bolt after the inner end thereof engages either an inside surface of the chuck or a member inserted in the transverse passage.

Further objects and advantages of the invention will be apparent from a reading of the following description in conjunction with the accompanying drawings in which:

FIG. 1 is a view in longitudinal section illustrating a typical expansion shield arranged according to the invention; and FIG. 2 is a side view partly broken away showing the manner of removal of a broken-off head portion according to the invention.

As illustrated in FIG. 1, a representative self-drilling shield 10 according to the invention comprises a metal shield body 11 having an axial bore 12 and terminating at the forward end in an annular row of teeth 13 which are preferably hard to facilitate drilling. In addition, the drilling end of the shield has longitudinal grooves 14 formed in its outer surface so that it can be expanded within a hole in the usual manner by inserting a conical plug member (not shown) in the end of the shield and driving the shield against the bottom of the hole to grip the surrounding masonry. Within that part of the shield body 11 which is not expanded the central bore 12 has an internal thread 16 to receive a bolt or other threaded support member.

At the end remote from the teeth 13 the shield 10 includes a head portion 17 shaped to fit into a driving chuck 19, shown in FIG. 2, and arranged to be broken off after the shield body 11 has been embedded. To this end, the external surface 18 of the head is tapered inwardly to mate with a conical hole 20 in the chuck 19 and an annular groove 21 (shown in FIG. 1) in the periphery of the shield provides a weakened joint between the head portion and the shield body. Customarily that part 27 of the axial bore within the head portion of an expansion shield is made substantially smooth to facilitate the passage of drill cuttings and, after the head portion has been broken off, an ejector tool must be inserted in a transverse chuck passage 22 to force it out of the chuck.

In accordance with the present invention however, the shield 10 is formed with a gripping element in the axial bore 27 within the head portion 17 and, in the typical embodiment of the invention illustrated in the drawings, the gripping element comprises an internal thread 23 in the bore. Preferably, the thread 23 has the same gauge and pitch as the thread 16 in the shield body. With this arrangement the same bolt 24 used to mount an object on the shield body 11 by mating with the thread 16 can be utilized, as shown in FIG. 2, to engage the gripping thread 23 and force the head portion 17 out of the chuck 19 by abutting an interior chuck surface 26. If desired, a single thread can be cut into the axial bore so that it extends into both the shield body 11 and the head portion 17. In the illustrated embodiment however, the portion 25 surrounded by the groove 21 is undercut before the thread has been cut into the shield. This separates the thread into two segments 16 and 23 and weakens the joint between the body and the head portion.

In operation, the head portion 17 of a shield 10 is fitted into the mating hole 20 of a driving chuck and the shield is used as a drill to form a hole in masonry by imparting axial blows to the chuck with a power hammer or the like. After the hole has been bored a conical plug is placed in the drilling end of the shield and the shield is replaced in the bored hole. When axial blows are again imparted to the chuck the forward end of the shield is expanded by the plug to form a tight and secure fit with the surrounding masonry.

With the shield body 11 thus secured, the chuck 19 is given a sharp lateral blow causing the head portion 17 to break away from the shield body at the annular groove 21. Usually the tapered head portion 17 remains firmly locked in the conical hole of the chuck 19 after it is broken off as a result of the axial blows imparted during the drilling operation.

To extract the head portion simply and efficiently according to the invention, the mounting bolt 24 is threaded into the internal thread 23 in the bore of the head portion. As illustrated in FIG. 2 the bolt may then be turned until its inner end engages the interior surface 26 of the chuck body so that further turning forces the head portion out of the chuck easily. If desired the bolt 24 may be turned against a bar or shaft (not shown) inserted in the transverse passage 22 of a chuck having no immediately adjacent interior surface 26.

From the foregoing, it will be readily apparent that the present invention provides a simple and effective means for removing the broken-off head portion of a shield from a driving chuck without requiring an ejector tool. Moreover, a broken-off head portion having the internal gripping means of the present invention can be readily removed in cases where removal by the use of an ejector tool would be impossible.

Although the invention has been described herein with the reference to a specific embodiment, many modifications and variations therein will readily occur to those skilled in the art. Accordingly all such variations and modifications are included within the intended scope of the invention as defined by the following claim.

We claim:

A self-drilling expansion shield comprising a cylindrical body having an axial bore extending from one end to the other and including a plurality of drilling teeth formed at one end, bore means at said one end to receive an expander, means in the cylindrical body adjacent to said one end to facilitate expansion thereof by said expander, an annular groove in the outer surface of the body spaced inwardly from the other end, an axially tapered outer surface between the annular groove and the other end, and two thread portions formed in the axial bore separated by a relatively smooth bore portion having a diameter greater than the thread portions, the smooth bore portion being surrounded by the annular groove in the outer surface.

References Cited in the file of this patent

UNITED STATES PATENTS

| | | |
|---|---|---|
| 1,457,749 | Rast | June 5, 1923 |
| 1,621,598 | Phillips | Mar. 22, 1927 |
| 1,746,050 | Phillips | Feb. 4, 1930 |
| 1,996,121 | Phillips | Apr. 2, 1935 |
| 2,901,787 | Whistler | Sept. 1, 1959 |